United States Patent
Ewing (10) Patent No.: US 12,344,158 B1
(45) Date of Patent: Jul. 1, 2025

(54) COMMERCIAL VEHICLE EQUIPMENT SIGNAL SYSTEM

(71) Applicant: Jimmie L. Ewing, Aurora, CO (US)

(72) Inventor: Jimmie L. Ewing, Aurora, CO (US)

(*) Notice: Subject to any disclaimer, the term of this patent is extended or adjusted under 35 U.S.C. 154(b) by 240 days.

(21) Appl. No.: 15/818,619

(22) Filed: Nov. 20, 2017

Related U.S. Application Data (63) Continuation of application No. 14/924,386, filed on Oct. 27, 2015, now abandoned.

(51) Int. Cl.
*B60Q 1/00* (2006.01)
*B60Q 1/26* (2006.01)
*B60Q 1/32* (2006.01)
*B60Q 9/00* (2006.01)
*B60R 11/04* (2006.01)
*H04N 7/18* (2006.01)

(52) U.S. Cl.
CPC ............ *B60Q 1/0023* (2013.01); *B60Q 1/26* (2013.01); *B60Q 1/32* (2013.01); *B60Q 9/008* (2013.01); *B60R 11/04* (2013.01); *H04N 7/181* (2013.01); *B60R 2300/105* (2013.01); *B60R 2300/50* (2013.01); *B60R 2300/8086* (2013.01)

(58) Field of Classification Search
CPC ...... B60Q 1/503; B60Q 9/008; B60Q 1/0023; B60Q 1/50; B60Q 1/46; B60Q 1/34; B60Q 1/32; B60Q 1/2696; B60Q 1/2615; B60Q 1/26; B60R 11/04; B60R 2300/105; B60R 2300/20; B60R 2300/207; B60R 2300/50; B60R 2300/802; H04N 7/181

See application file for complete search history.

(56) References Cited

U.S. PATENT DOCUMENTS

| | | | | |
|---|---|---|---|---|
| 2,854,650 A | * | 9/1958 | Baker | B60Q 1/503 340/470 |
| 3,750,138 A | * | 7/1973 | Burgan | G09F 9/30 340/332 |
| 4,297,675 A | * | 10/1981 | Rubottom | B60Q 1/50 340/431 |

(Continued)

FOREIGN PATENT DOCUMENTS

| | | | | |
|---|---|---|---|---|
| GB | 2435341 A | * | 8/2007 | B60Q 1/50 |
| JP | 07232590 A | * | 9/1995 | |

(Continued)

*Primary Examiner* — John Villecco
(74) *Attorney, Agent, or Firm* — Hall Estill Law Firm (57) ABSTRACT

A system for warning drivers of the movements semi-tractor and trailer vehicles of the semi-tractor's intended course, and warning drivers of other vehicles around the semi-tractor of the course and intended movement of the semi-tractor. An example includes a closed circuit video display system including cameras mounted at the front corners of the semi-tractor, cameras mounted at the rear of the trailer, and cameras mounted from a central area of the semi-tractor trailer. The system also uses a written message display system having display modules that display messages to vehicles near the semi-tractor. The displays can be used to present various pre-programmed messages or messages created by the driver of the semi-tractor through a message input interface, allowing the driver of the semi-tractor to provide customized massages to other nearby drivers.

2 Claims, 6 Drawing Sheets

(56) References Cited

U.S. PATENT DOCUMENTS

| | | | | |
|---|---|---|---|---|
| 4,928,084 A * | 5/1990 | Reiser | B60Q 1/444 | 340/469 |
| 4,974,354 A * | 12/1990 | Hembrook, Jr. | B60Q 1/503 | 340/470 |
| 5,426,414 A * | 6/1995 | Flatin | B60Q 1/503 | 116/28 R |
| 5,574,428 A * | 11/1996 | Groover | B60Q 1/503 | 327/385 |
| 5,905,434 A * | 5/1999 | Steffan | B60Q 1/50 | 116/28 R |
| 6,067,011 A * | 5/2000 | Leslie | B60Q 1/503 | 340/468 |
| 6,133,851 A * | 10/2000 | Johnson | B60Q 1/30 | 340/431 |
| 6,154,126 A * | 11/2000 | Beasley | B60Q 1/52 | 340/468 |
| 6,195,000 B1 * | 2/2001 | Smith | B60Q 1/503 | 340/425.5 |
| 6,300,870 B1 * | 10/2001 | Nelson | B60Q 1/503 | 340/463 |
| 6,304,174 B1 * | 10/2001 | Smith | B60Q 1/503 | 340/425.5 |
| D463,050 S * | 9/2002 | Zwisler | D26/31 | |
| D478,935 S * | 8/2003 | Gearhart | D12/162 | |
| 6,865,835 B1 * | 3/2005 | Webster | G09F 21/048 | 40/452 |
| 7,020,992 B1 * | 4/2006 | Christie | G09F 21/04 | 40/593 |
| 7,095,318 B1 * | 8/2006 | Bekhor | B60Q 1/26 | 340/464 |
| 7,233,849 B2 * | 6/2007 | Hill | B60Q 1/503 | 701/28 |
| 7,378,948 B2 * | 5/2008 | Somuah | B60Q 1/503 | 180/167 |
| 7,659,808 B1 * | 2/2010 | Cooper | B60Q 1/503 | 340/425.5 |
| D647,971 S * | 11/2011 | Browne | D20/10 | |
| 8,083,260 B2 * | 12/2011 | Haynes | B60J 11/06 | 280/770 |
| 8,525,659 B2 * | 9/2013 | Lin | B60Q 1/38 | 340/468 |
| 8,670,035 B2 * | 3/2014 | Robert | B60R 1/00 | 348/148 |
| 9,007,193 B2 * | 4/2015 | Boston | B60Q 1/503 | 340/425.5 |
| 9,126,531 B1 * | 9/2015 | Adams | B62D 25/188 | |
| 9,135,842 B1 * | 9/2015 | Riley | G09F 21/04 | |
| 9,440,660 B2 * | 9/2016 | Sherony | B60W 50/12 | |
| 10,261,513 B2 * | 4/2019 | Reiley | G05D 1/0214 | |
| 10,311,770 B2 * | 6/2019 | Ishizuka | G09G 3/2003 | |
| 2002/0112026 A1 * | 8/2002 | Fridman | A61K 38/2221 | 709/217 |
| 2004/0183659 A1 * | 9/2004 | Somuah | B60Q 1/503 | 340/435 |
| 2005/0007244 A1 * | 1/2005 | Lang | G01S 15/931 | 340/435 |
| 2005/0280514 A1 * | 12/2005 | Doan | B60K 35/00 | 340/425.5 |
| 2007/0030139 A1 * | 2/2007 | Ellison | B60Q 1/503 | 340/482 |
| 2008/0068455 A1 * | 3/2008 | Pratt | B60R 1/00 | 348/118 |
| 2009/0109014 A1 * | 4/2009 | Jones | B60Q 1/50 | 340/468 |
| 2009/0243882 A1 * | 10/2009 | Brown | G08G 1/162 | 340/905 |
| 2011/0295697 A1 * | 12/2011 | Boston | B60Q 1/503 | 705/14.68 |
| 2012/0098652 A1 * | 4/2012 | Varella | B60Q 1/503 | 340/425.5 |
| 2014/0005860 A1 * | 1/2014 | Chance | B60Q 1/2615 | 701/2 |
| 2014/0247160 A1 * | 9/2014 | Glascock | G08G 1/095 | 340/907 |
| 2014/0267014 A1 * | 9/2014 | Williams | G06F 3/02 | 345/156 |
| 2015/0032328 A1 * | 1/2015 | Healey | B60Q 1/503 | 701/36 |
| 2015/0194082 A1 * | 7/2015 | McEwan | G09F 21/048 | 40/209 |
| 2016/0039343 A1 * | 2/2016 | Jones | B60R 1/00 | 348/140 |
| 2016/0132164 A1 * | 5/2016 | Bowden | G06F 3/0412 | 715/753 |
| 2016/0379411 A1 * | 12/2016 | Harbach | G06F 3/147 | 345/633 |
| 2017/0057407 A1 * | 3/2017 | Gee | B60Q 1/503 | |
| 2017/0200197 A1 * | 7/2017 | Brubaker | G09F 9/35 | |
| 2017/0293639 A1 * | 10/2017 | Lee | B60Q 1/503 | |
| 2018/0173237 A1 * | 6/2018 | Reiley | G05D 1/0214 | |
| 2018/0257552 A1 * | 9/2018 | Hellge | B60Q 1/52 | |
| 2018/0334089 A1 * | 11/2018 | Huang | B60Q 1/346 | |
| 2019/0135216 A1 * | 5/2019 | Church | B60R 21/01538 | |

FOREIGN PATENT DOCUMENTS

| | | | |
|---|---|---|---|
| JP | 08127291 A | * | 5/1996 |
| JP | 2001206140 A | * | 7/2001 |

* cited by examiner

COMMERCIAL VEHICLE EQUIPMENT SIGNAL SYSTEM

REFERENCE TO RELATED APPLICATIONS

This application claims the benefit of, and incorporates herein by reference in its entirety, my application having serial number which Ser. No. 14/924,386, which is incorporated herein by reference in its entirety.

BACKGROUND OF THE INVENTION

(a) Field of the Invention

This application relates to a system and device for providing signals messages appearing on a messaging vehicle, such as a tractor trailer, the signals and messages being positioned on the messaging vehicle so that they are visible by nearby drivers of individuals. The messages are assembled and controlled by a driver in the messaging vehicle.

(b) Discussion of Known Art

The use of printed messages, such as hinged stop signs on school busses, is known. However, there remains a need for a system that allows a driver of a large semi-tractor and trailer vehicle to provide messages to drivers that may be directly next to the trailer at approximately mid-way along the length of the trailer, as well as to oncoming vehicles or vehicle approaching from the rear.

SUMMARY

The general design involves an enclosure used as a lighted signal or sign that is to be attached to big rig 18 wheelers freightliner trucks. This device acts as a signal to motorists, when making wide right and left turn.

There are to be text messages in (English And Spanish) Visible and to be texts reading to motorists that this truck are begun to make a wide left are right turn. Material and structure is to be appropriate for outdoor used attached to the exterior for (Big Rig Freightliner Trucks). The disclosed product is designed for mass-production manufacturing processes.

The main Control Panel, with lane changing on and off button and night vision and infrared camera allow the driver to see all around the truck, when making wide left and wide right turn, and changing lane, when driving on highways and city street, motorists don't seem to pay attention to the small lights on big rig freightliner trucks. When changing lane on the interstate highways. This Commercial Vehicle Video Equipped System. Can be retrofit to all big rig freightliner trucks and other big commercial vehicles, such as city bus, passenger bus, limousine, sightseeing bus, motor coach, common carrier. Each side of trailer with camera and sensor device to detect and measure, the distance between two truck or any vehicle, that traveling down the interstate highways if the driver, seem to be little drowsy, on the control module is three light green orange and red, the green light on at all time, the orange and the red light is off, until the tractor-trailer start to coming to close the orange light will flash on and off on the control module, when the tractor-trailer start to come to close than the red light come on and the buzzer alert the driver that that he is about to collide, he will be able to see all around him, why driving on the highway and city street, on the control module display in the (CAB). The night vision camera with infrared allow the driver to see at night and day, if something is to close the (Buzzer). Will alarm the driver, the night vision Camera and infrared will be on each side of the trailer and back of trailer and front of (CAB). That will be an edge on safety with (Insurance Company) and over any competitor. That the disclosed (Commercial Vehicle Video Equipped System) is safe and will save time and lives.

DRAWINGS

The accompanying drawings illustrate preferred embodiments of the present invention according to the best mode presently devised for making and using the instant invention, and in which.

DETAILED DESCRIPTION

The Commercial Vehicle Video Equipped Signal System (VSS) is an enhanced exterior lighted signaling system for large commercial tractor-trailer vehicles and any vehicle that can utilize its capabilities. The system incorporates an in-cab monitoring and control terminal that communicates with six external signal devices, each of which incorporates a video camera sensitive at infrared light wavelengths.

The In-Cab Terminal consists of a rugged poly case within which three NTSC video LCD displays are mounted. The terminal is available in either a horizontal or vertical display configuration. Alongside the LCD displays are switches that provide the operator with control over the operation of the system.

The system monitors the vehicle's turn and brake signals for integrated operation with these indicators, allowing the driver to operate the vehicle in a normal manner without distraction. The three terminal video displays present the image from the displays on the active side of the system. The first (top or left) display shows the video image from the front cameras, the second (middle) display shows the side mounted camera images and the third (bottom or right) display shows the rear camera images.

When the vehicle operator activates the turn signal, the camera images are displayed from the corresponding left or right sides of the vehicle. This provides the operator with a full 180-degree view of the immediate area and can show unseen hazards or vehicles not visible in mirrors.

Each external signal device incorporates a multi-color, LED character display. Each character in the display is a dot matrix arrangement of 5 by 7 inches, yellow and red LED emitters enclosed in an open, reflective grille to enhance visibility. The character segments are arranged as two lines of eight characters. The display is capable of indicating alphanumeric text and simple graphics.

Text and graphics are not restricted by color and can be blinking, fixed or scrolled horizontally and vertically. Text can be displayed in a wide variety of fonts and can include any special characters. Text messages can be fixed or dynamic related to the speed of the vehicle. Vehicles traveling at road speeds can show messages related to changing lanes. Vehicles traveling at very low speeds can indicate wide turn messages.

Figure 1:
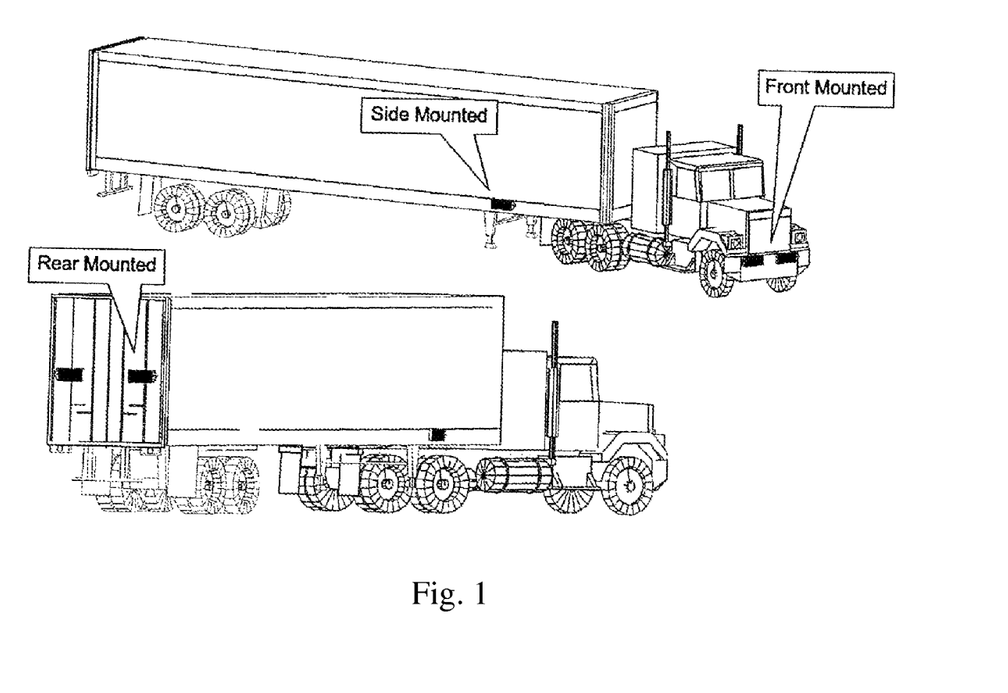
FIG. 1 illustrates the placement of the message displays and cameras of the disclosed system.
Figure 2:
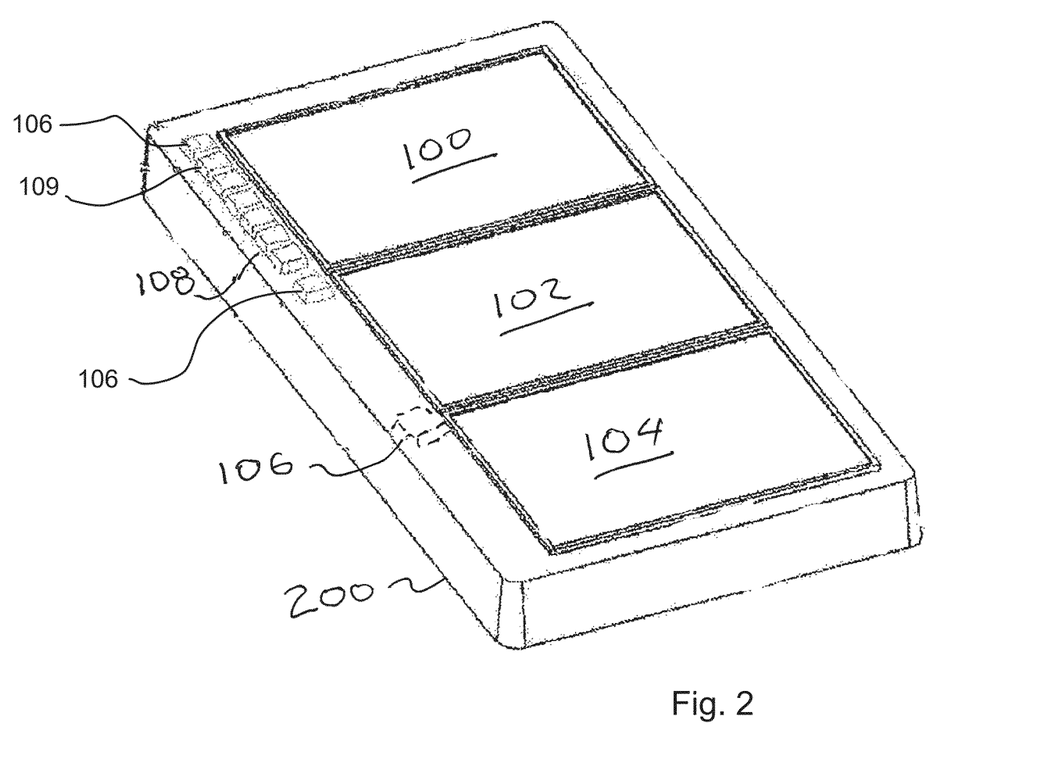
FIG. 2 illustrates the communication panel or interface for creating the message displays and viewing images from cameras of the disclosed system.

In-Cab Terminal General Description A vertically oriented display terminal 200 with its primary features is shown in FIG. 2, which shows:
1. Front/Forward Video Display 100;
2. Side Video Display 102;
3. Rear Video Display 104;
4. Camera—Signal Power switch 106;
5. Menu Activation switch 108; and
6. On-Screen Menu Select switch 109.

Video images are displayed from the Corresponding cameras of the turn indicators 112.

Each set of camera—signal pairs on the front, sides and rear of the vehicle have independent power controls 106. When active, these controls are illuminated. The menu activation control, 108, enables the on screen display and provides the user with access to the system setup and operational functions. These functions include:
 a. Display Message Text or Graphic Select
 b. Text Scrolling, Blinking, or Static display
 c. Text Color if bi-color External Display Devices are used;
 d. Language—English, Spanish, French or other
 e. Video Display Brightness—Contrast
 f. Camera Position Vehicle headlight activation automatically dims illuminated controls and video displays for low-level light or night driving conditions. Exterior display brightness is also controlled at factory-preset levels.

External Signal Device General Description

Figure 3:
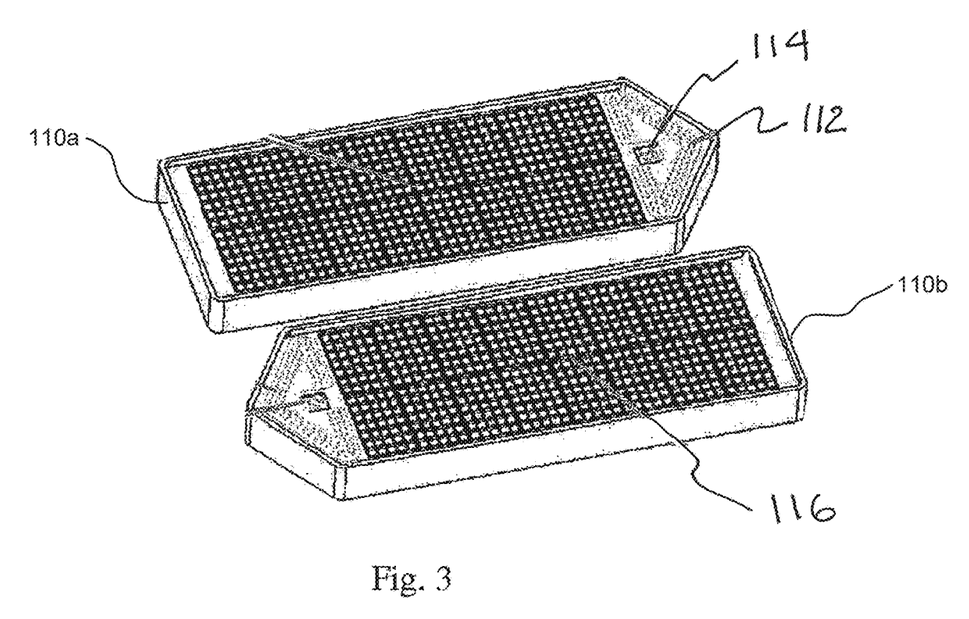
FIG. 3 illustrates preferred examples of the message displays and turn signals used with the disclosed system.
Figure 4:
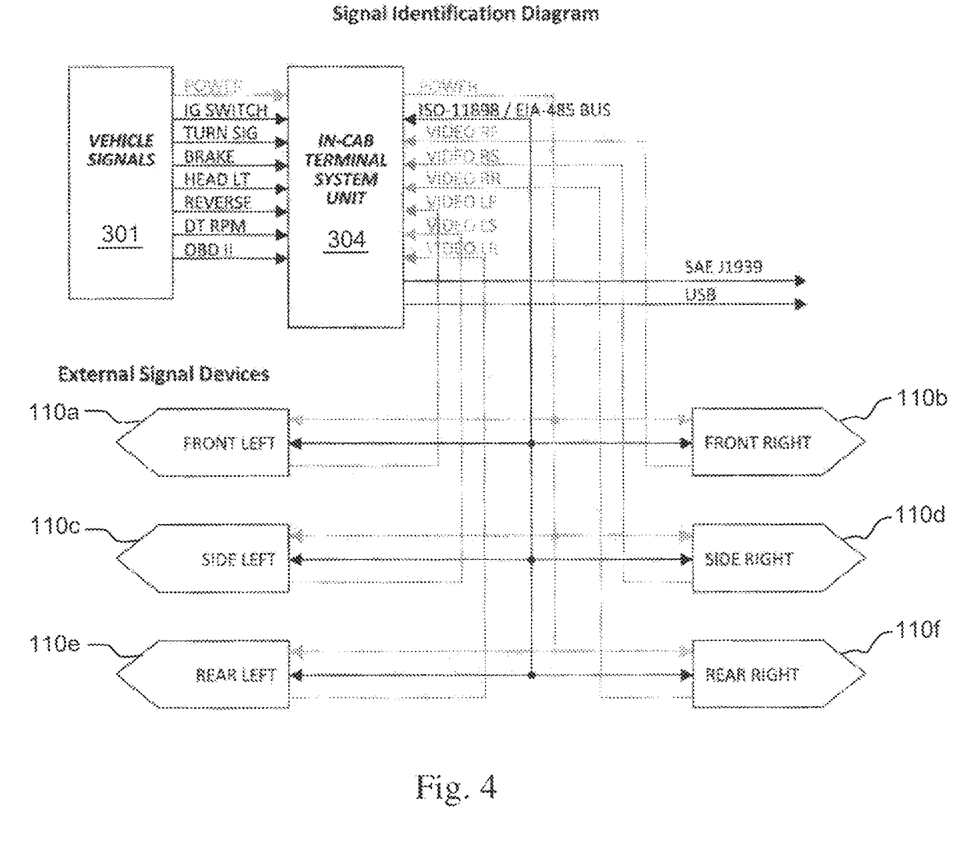
FIG. 4 illustrates a diagram of the electronic control schematic used with the disclosed system.

External signal devices (or external display devices) 110a-110f are provided in pairs (e.g., 110a and 110b, 110c and 110d, 110e and 110f) as shown in FIGS. 3-4:
The primary features are:
7. Turn Indicator 112;
8. Video Camera with IR Illumination 114; and
9. Text Character Display Area 116.

The display is fabricated using a rugged glass filled polycarbonate or polyester material, which is resistant to UV and chemicals. The light emitter devices and electronic drivers are sealed in a transparent silicone compound. The video camera is gimbaled allowing horizontal positioning via a motor and lead screw. Optional vertical gimballing allows vertical position adjustment via a motor and lead screw.

Electrical Signals Description

Figure 5:
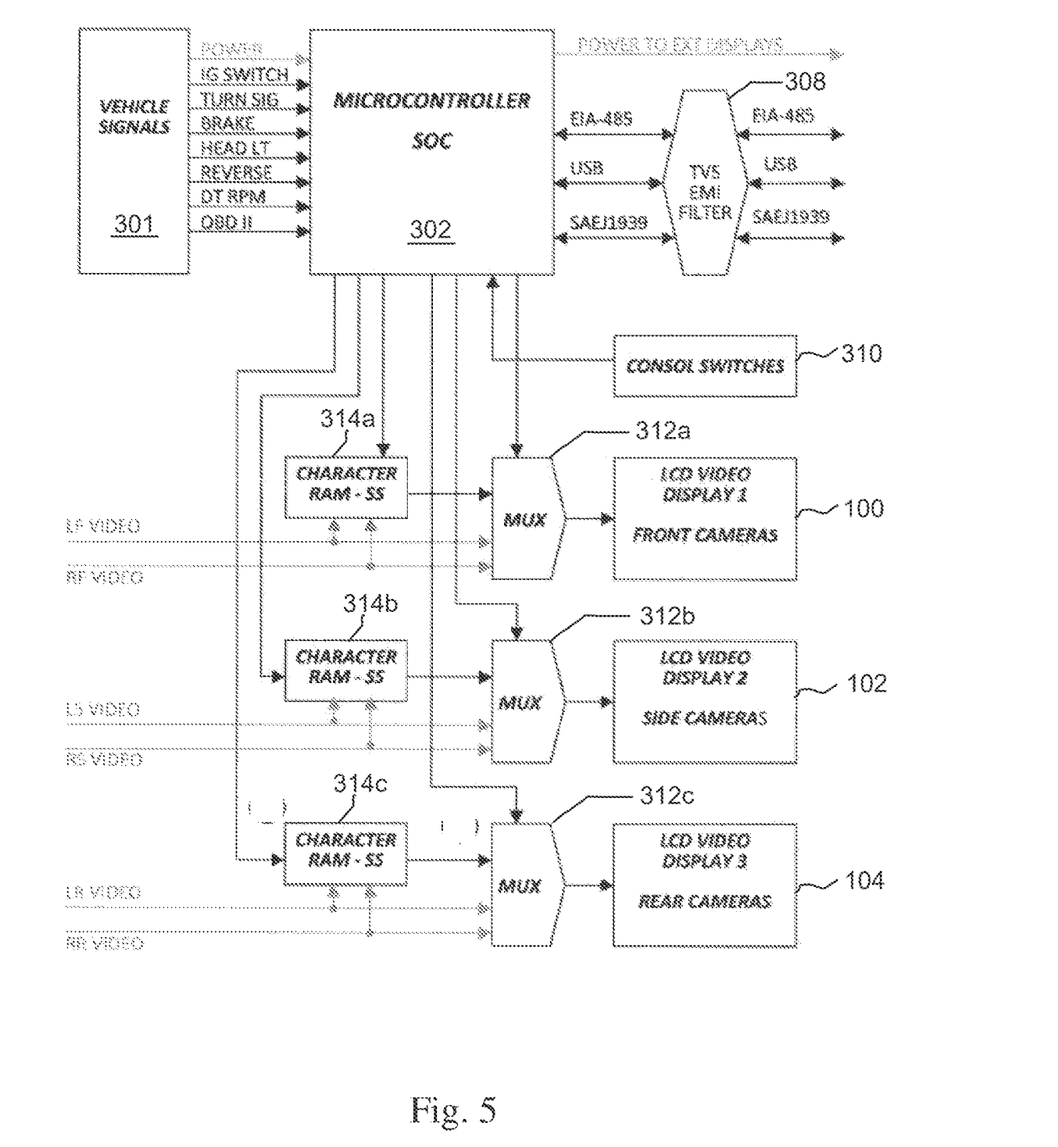
FIG. 5 illustrates a block diagram of the primary electronic data controls used with the disclosed system.
Figure 6:
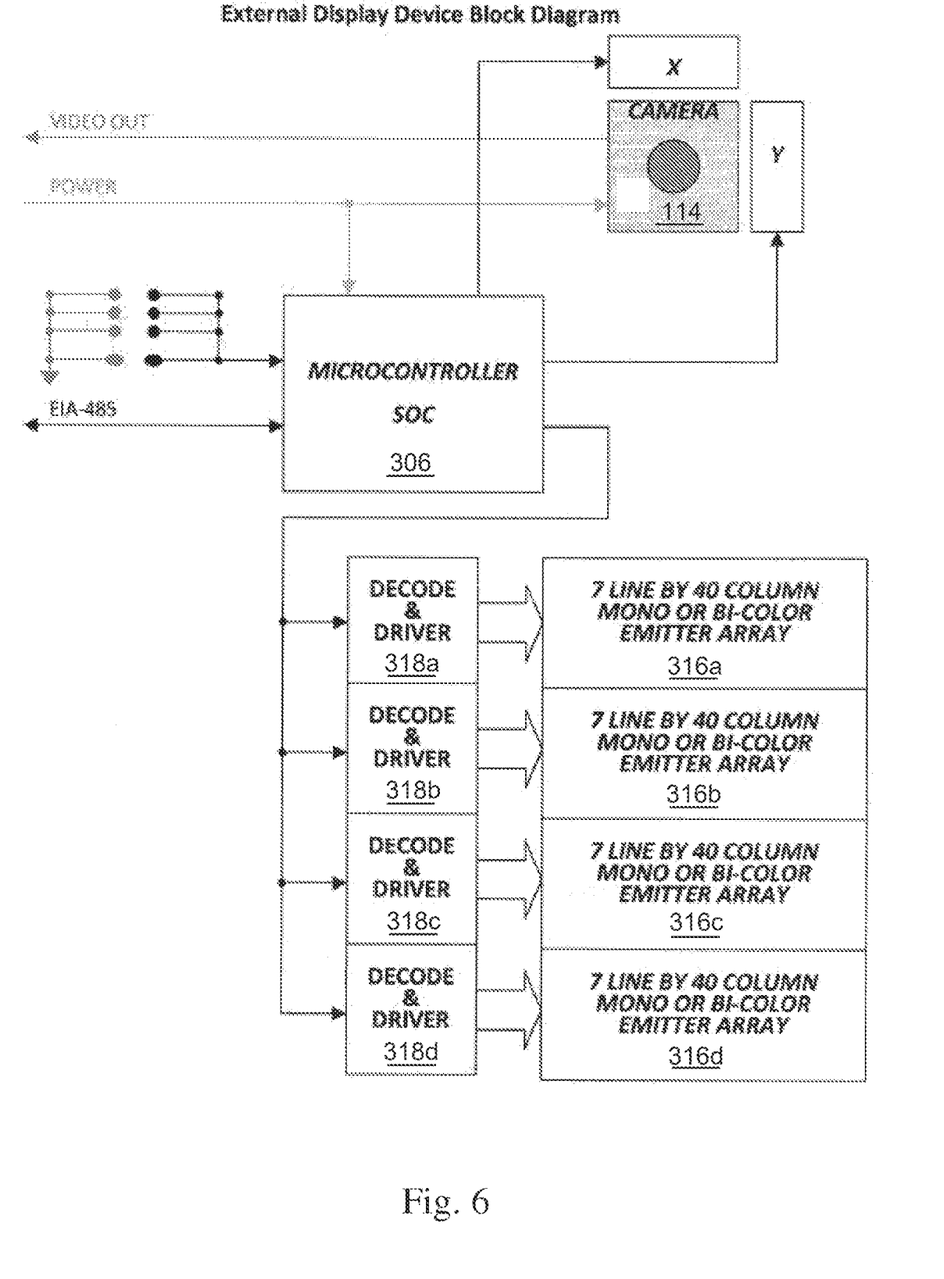
FIG. 6 illustrates the microprocessor controls of the message displays and cameras of the disclosed system.

The Commercial Vehicle Video Equipped Signal System 300 is a multi-controller based device, which incorporates a primary microcontroller master 302 in the In-Cab Terminal 304 and slave microcontrollers 306 in each of the external signal devices 100a-110f, as generally shown in FIGS. 4-6. Control of the external signal devices 110a-110f is accomplished by message passing from the master controller 302 to the slave controllers 306. Messages are passed bi-directionally via a dedicated digital balanced multi-point signal path using the ANSI/TIA/EIA-485 standard or the automotive 150-11898 (CAN) vehicle bus standard. External signal devices recognize unique message identifiers via the electrical connector-wiring configuration so each may be addressed individually, or in groups.

Additional ports providing USB and 5AE J1939 ports are provided on the In-Cab Terminal 304 for system expansion and diagnostics/programming capabilities. Messages are passed using register read and write commands as well as script messages. 150-11898 error detection and correction is utilized for message validation per the CAN error frame protocol.

The In-Cab Terminal system unit 304 uses the following vehicle power and signals 301:
 a. 12 Volt DC Power
 b. Ignition Switch On
 c. Right and Left Turn Signal's
 d. Brake Signal
 e. Headlight Low Beam & High Beam
 f. Reverse
 g. Drive Train RPM The vehicle power and signals listed invoke the following functions when active:

12 Volt DC Power

12 Volt DC power is provided by a direct connection to the battery in the vehicle. This is the main power source for the system and allows the system to be operated whether the vehicle engine is running or not. This allows the system to be operated, programmed or diagnosed while the vehicle ignition switch is in the OFF position. When the engine is not running, the main power switch lamp will flash OFF periodically if the system is in use. When the engine is running, the main power switch lamp is illuminated continuously. After a preset amount of time with no user activity, the system goes into sleep mode until one of the in-cab console switches is activated.

The 12 Volt DC power to all External Display Devices is controlled by the In-Cab Terminal unit.

Ignition Switch ON

When the system sees the ignition switch ON signal become active and the system comes out of sleep mode and the system becomes active. In the active state, the following vehicle signals are monitored:
 a. Right & Left Turn Signal's
 b. Brake light Signal
 c. Head Light low Beam & High Beam
 d. Reverse
 e. Drive Train RPM All video cameras on the default or preset left or right side become active. The default side for North America is the right side.

Ignition Switch OFF

When the system sees the ignition switch is OFF, the above listed signals are ignored. The system can only be programmed in this mode. Special function operations can be enabled for diagnostics and testing of system components. Additional safety functions can also be enabled in this more. These functions include:
 a. External Display Device Test—Any Unit;
 b. External Display Device Message—Any Unit
 c. Camera Enable—Left or Right Side
 d. Program External Display Device Message Streams
 e. Program External Display Device Message Text or Symbol.

Right & Left Turn Signal

The left and right turn signals are monitored for left turn signal, right turn signal and hazard signal (both active). The system can be programmed to activate External Display Devices to flash message streams either in sync with the vehicle's flash rate, or asynchronously at a system predefined flash rate. External Display Device messages are selected based on the vehicle DRIVE TRAIN RPM or a single fixed message not controlled by speed. The DRIVE TRAIN RPM set point selects which message will be displayed based on the speed of the vehicle. If the vehicle is going between 0 and 5 MPH, turn messages can be programmed to display WIDE TURN on the left or right side of the vehicle depending on the turn signal activated. For speeds over 5 MPH, the messages can be programmed to display LANE CHANGE.

Hazard signal conditions (both left and right turn signals operating) cause all External Display Devices to display the same programmed message. These message streams can be selected by vehicle speed or be fixed.

Side and front External Display Devices have yellow light emitters.

Brake Signal

Brake signal is monitored and will override the rear External Display Devices current activity to display a braking message. Braking message streams are fixed and use red emitters.

Rear External Display Devices have red and yellow light emitters.

Headlight Low Beam & High Beam

Headlight low and high beam signals are used for dimming the in-cab lamp and video display backlight intensity. These values are programmable by the operator. If high beams are on, a special symbol is displayed on the video monitors.

Reverse Signal

Reverse signal is monitored and when active displays messages specific to reverse operation of the vehicle.

Drive Train RPM Signal

The Drive Train RPM signal is generated by a magnetic pickup located near the drive shaft of the of the vehicle providing propulsion. The velocity of the vehicle is determined by the time interval between pulses from the pickup sensor. Alternatively, if vehicle speed data is available via the On-Board Diagnostics port, (OBD II), an external transducer is not required. The VSS uses the speed data for the internal threshold that determines whether low speed messages are displayed or en-route/highway speed messages are displayed.

OBD II Signals

When On-Board Diagnostics data (OBD II) is available in the vehicle, The VSS In-Cab Terminal has access to vehicle parameters such as speed, fuel consumption, engine parameters and environmental data.

Depending on the vehicle make and model and the data present, these parameters can be displayed on the video monitors on the terminal. These features are provided to be customized for specific vehicles and fleets.

ISO-11898/EIA-485 BUS

ISO-11898 (Controller Area Network, CAN) is a vehicle bus standard designed to allow devices to digitally communicate with each other within a vehicle. ISO-11898 bus is a message-based protocol and is one of five protocols used in the on-board diagnostics (OBD II) vehicle diagnostics standard. The OBD II standard has been mandatory for all cars and light trucks sold in the United States since 1996, and the EOBD standard has been mandatory for all petrol vehicles sold in the European Union since 2001 and all diesel vehicles since 2004. Implementation of ISO-11898 in the VSS is not mandatory but does allow for future expansion capabilities in the External Display Devices. EIA-485 will be the default data communication configuration between the In-Cab Terminal and the External Display Devices.

EIA-485, also known as TIA-485 or RS-485, defines the electrical characteristics of drivers and receivers for use in balanced digital multipoint communications. This allows VSS communication between the In-Cab Terminal and External Display Devices over long distances and in electrically noisy environments. Multiple receivers may be connected in a multi-drop network configuration. EIA-485 offers data transmission speeds of 100 kbit/s over 4000 feet as it uses a differential balanced line over twisted pair wires. RS-485 drivers in the In-Cab Terminal and External Display Devices need to be put in transmit explicitly by asserting a signal to the driver.

The messaging protocol between the In-Cab Terminal 304 and the External Display Devices 110a-110f is a master-slave configuration where the In-Cab Terminal 304 is the master and all External Display Devices 110a-110f are slaves. The master always initials communication and the slave devices either receive commands with no reply or reply to requests for status information.

Normal data traffic between the master and slave devices consist of read or write memory transfers either in individual 16-bit words or blocks of consecutive 16-bit words. Script messages can also be implemented to allow compliance with third party devices.

Camera Video Signals

As generally shown in FIG. 4, the following camera video signals are assigned to their respective External Display Devices 110a-100f.

Video RF is received from the Right Front (RF) External Display Device 110b.

Video RS is received from the Right Side (RS) External Display Device 110d.

Video RR is received from the Right Rear (RR) External Display Device 110f.

Video LF is received from the Left Front (LF) External Display Device 110a.

Video LS is received from the Left Side (LS) External Display Device 110c.

Video LR is received from the Left Rear (LR) External Display Device 110e.

The video signals use the NTSC RS-170A format and transmission lines can be either 75 ohm coaxial or balances twisted pair cable. The video signals originate at the CCTV cameras mounted inside the External Display Devices 110a-110f and are asynchronous with respect to each other.

SAEJ1939

SAE J1939 is optionally supported as it is used in the commercial vehicles for digital communication between the tractor and trailer as is specified in ISO 11992. J1939, ISO 11783 and NMEA 2000 all share the same high-level protocol. Diesel engine manufacturers have adopted SAE J1939, so a port capability is provided for future system connectivity.

USB

Universal Serial Bus (USB) is an industry standard that defines the cables, connectors and communications protocols used between computers and electronic devices. It is supplied as a UART communications bridge between the VSS In-Cab Terminal microcontroller and commercially available laptop computers, tablets and desktop PC's. Application software running on the external computer can access VSS In-Cab Terminal commands allowing the VSS system to be programmed and configured.

The VSS In-Cab Terminal is the master control device for the VSS system. It receives vehicle signals from a connector/header which attaches to a cable assembly wired to the system signals identified.

Except for 12 Volt Battery Power and Chassis Ground, vehicle signals are only sampled and not driven by the VSS in any way. The Micro controller System on a Chip (SOC) ( ) is the processing and control device running the main program stored in its internal FLASH EPROM. A TIY console USB port accomplishes access to the programming functions. Factory programming is accomplished via pins on the main Circuit Card Assembly (CCA) that are not user accessible.

In addition to the USB programming and configuration port, the VSS External Display Devices EIA-485 communications bus and SAE J1939 protocol port are protected by a transient voltage suppressor (TVS) and EMI filter 308. The USB connector conforms to the USB connector outline. The EIA-485 and SAE J1939 signals are located in the terminal to External Display Devices connector. Consol user control switches 310 provide the following functions:
  a. Main Power 1 (Red Illuminated);
  b. Camera Power 2 (Red Illuminated);
  c. Camera Power 3 (Red Illuminated);
  d. Menu Activation (Blue Illuminated); and,
  e. On-Screen Menu Select (Green Illuminated).

Main power to the system is activated or de-activated by pressing the front camera—signal power switch 106. Cameras 114 in External Display Devices 110*a*-110*f* can be activated when main power is off by pressing the corresponding red switch next to the display.

The menu activation switch 108 brings up the on screen menu display. This display is used to program and configure the system at the user level.

The On-Screen Menu Select switches 109 are soft keys defined by the mode the system is in.

The LCD video displays display camera video from the active side of the vehicle. The default non-active side is right for North America and can be programmed to be either side. The active side is controlled by the left or right turn signal, and the non-active default is used for all other actions.

The image source on the displays is switched via a multiplexer 312*a*-312*c* under micro controller 302 command to either the left or right cameras. On-screen text and symbol display is also multiplexed and can be enabled regardless of video source currently active.

The Character RAM/Sync Stripper 314*a*-314*c* for each display stores the pixel gray scale value for characters and symbols to be overlaid onto the camera video image. The Character RAM is synchronized with the video camera timing via use of a sync stripper circuit that provides horizontal and vertical timing derived from the sync burst in the video signal. This allows stable graphic and character overlay.

The Character Ram controls the multiplexer which switches to a DC level during active pixel display.

The External Display Device is used in groups and each unit responds to commands that match the unit's hard-wired address. The hard-wired address is accomplished in the unit's main connector by wiring specific pins to ground. The External Display Device emitters are symmetrically arranged so the unit can be oriented facing either a left or right. An additional programming pin in the connector allows the device to automatically orient text and graphics to either a left or right unit orientation.

The microcontroller SOC 306 receives commands via the multidrop EIA-485 network connection. When power is first applied, the unit performs a power on self test and stores the result in a memory location.

Then the EIA-485 port is set to receive and when a command is received with the same address as hardware decoded the unit executes that command.

The video camera 114 is always on independent of the state of the External Display Device processor and has a dedicated power source that allows the camera to be operated while the rest of the External Display Device is inactive. The video camera incorporates Infra-red LED emitters for local illumination invisible to human sight. This allows the operator to check the sides and read perimeter of the vehicle from the cab.

The video camera is moveable via motor controlled screw actuators which allow the operator to adjust the angle of the camera for optimal operation.

The display area 116 consists of 4 blocks 316*a*-316*d*, each capable of displaying four five by seven inch dot matrix characters. The light emitting elements are arranged in a continuous 7 row by 20-column field.

Monocolor displays use 140 emitter elements and bi-color displays use 280. Each block has its own decoder—driver 318*a*-318*d* controlling power to each emitter.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

I claim:

1. A system for warning drivers that are near a semi-tractor and trailer vehicle of an intended course of the semi-tractor, the system comprising:
    six signaling devices with cameras, the six signaling devices comprising a front right signaling display and video camera, a front left signaling display and video camera, a right side signaling display and video camera, a left side signaling display and video camera, and a rear right signaling display and video camera and a rear left signaling display and video camera; and
    an in-cab terminal having a plurality of pre-programmed messages that are displayed on the signaling devices, so that the driver of the semi-tractor and trailer provides customized messages to at least one other driver near the semi-tractor and trailer depending on a position of the other driver in relation to the semi-tractor and trailer.

2. A system for warning drivers that are near a semi-tractor and trailer vehicle of an intended course of the semi-tractor, the system comprising:
    six signaling devices with cameras, the six signaling devices comprising a front right signaling display and video camera, a front left signaling display and video camera, a right side signaling display and video camera, a left side signaling display and video camera, and a rear right signaling display and video camera and a rear left signaling display and video camera; and
    an in-cab terminal having a plurality of pre-programmed messages that are displayed on the signaling devices, so that the driver of the semi-tractor and trailer provides a customized message to at least one other driver near the semi-tractor and trailer depending on a position of the other driver in relation to the semi-tractor and trailer, while providing other customized messages to other nearby drivers.

* * * * *